(12) United States Patent
Chaudhary et al.

(10) Patent No.: US 8,080,735 B2
(45) Date of Patent: Dec. 20, 2011

(54) STYRENIC POLYMERS AS BLEND COMPONENTS TO CONTROL ADHESION BETWEEN OLEFINIC SUBSTRATES

(75) Inventors: Bharat I. Chaudhary, Princeton, NJ (US); Kawai P. Pang, Belle Meade, NJ (US); Michael B. Biscoglio, Piscataway, NJ (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/679,423

(22) PCT Filed: Sep. 4, 2008

(86) PCT No.: PCT/US2008/075245
§ 371 (c)(1),
(2), (4) Date: Mar. 22, 2010

(87) PCT Pub. No.: WO2009/042364
PCT Pub. Date: Apr. 2, 2009

(65) Prior Publication Data
US 2010/0209056 A1    Aug. 19, 2010

Related U.S. Application Data

(60) Provisional application No. 60/974,944, filed on Sep. 25, 2007.

(51) Int. Cl.
*H01B 7/00* (2006.01)
(52) U.S. Cl. .................. 174/110 R; 174/119 C
(58) Field of Classification Search ............ 174/36, 174/110 R, 110 SC, 110 PM, 110 D, 110 FC, 174/102 SC, 102 R, 113 R, 102 P
See application file for complete search history.

(56) References Cited

U.S. PATENT DOCUMENTS

| | | | |
|---|---|---|---|
| 4,018,852 A | 4/1977 | Schober | |
| 4,150,193 A | 4/1979 | Burns, Jr. | |
| 4,246,142 A | 1/1981 | Ongchin | |
| 4,286,023 A | 8/1981 | Ongchin | |
| 4,493,787 A * | 1/1985 | Taniguchi et al. | 252/511 |
| 4,857,600 A | 8/1989 | Gross et al. | |
| 4,933,107 A * | 6/1990 | Watanabe et al. | 252/511 |
| 5,064,802 A | 11/1991 | Stevens et al. | |
| 5,246,783 A * | 9/1993 | Spenadel et al. | 428/461 |
| 5,272,236 A | 12/1993 | Lai et al. | |
| 5,278,272 A | 1/1994 | Lai et al. | |
| 5,346,961 A | 9/1994 | Shaw et al. | |
| 5,575,965 A | 11/1996 | Caronia et al. | |
| 5,986,028 A | 11/1999 | Lai et al. | |
| 6,086,792 A * | 7/2000 | Reid et al. | 252/511 |
| 6,284,374 B1 * | 9/2001 | Yamazaki et al. | 428/383 |
| 6,402,993 B1 * | 6/2002 | Easter | 252/511 |
| 6,496,629 B2 | 12/2002 | Ma et al. | |
| 6,514,608 B1 * | 2/2003 | Foulger | 428/372 |
| 6,714,707 B2 | 3/2004 | Rossi et al. | |
| 6,864,429 B2 * | 3/2005 | Easter | 174/110 R |
| 6,972,099 B2 * | 12/2005 | Easter | 252/511 |
| 2001/0030053 A1 * | 10/2001 | Gadessaud et al. | 174/102 SC |
| 2004/0217329 A1 | 11/2004 | Easter | |

FOREIGN PATENT DOCUMENTS

| | | |
|---|---|---|
| EP | 0334992 A1 | 10/1989 |
| EP | 0858081 A2 | 8/1998 |
| EP | 1146083 A1 | 10/2001 |
| JP | 02183912 | 7/1990 |
| JP | 03276516 | 12/1991 |
| JP | 11213772 | 8/1999 |
| JP | 2001256833 | 9/2001 |
| JP | 2001302856 | 10/2001 |
| WO | 9319104 | 9/1993 |
| WO | 9500526 | 1/1995 |
| WO | 9514024 | 5/1995 |
| WO | 9849212 | 11/1998 |
| WO | 2004031250 A1 | 4/2004 |

OTHER PUBLICATIONS

Randall, Journal of Macromolecular Science, Reviews in Macromolecular Chemistry and Physics, C29 (2&3), 201-317, 1989.

* cited by examiner

*Primary Examiner* — William Mayo, III
(74) *Attorney, Agent, or Firm* — Whyte Hirschboeck Dudek SC

(57) ABSTRACT

The insulation shield layer of a power cable having a blend of ethylene copolymer, e.g., vinyl acetate, and a Styrenic polymer, e.g., polystyrene. The insulation shield layer is adjacent to a polyolefin insulation layer of the power cable.

14 Claims, No Drawings

STYRENIC POLYMERS AS BLEND COMPONENTS TO CONTROL ADHESION BETWEEN OLEFINIC SUBSTRATES

CROSS REFERENCE TO RELATED APPLICATION

This application claims the benefit of U.S. Ser. No. 60/974,944, filed on Sep. 25, 2007; which application is fully incorporated herein by reference.

FIELD OF THE INVENTION

This invention relates to power cables. In one aspect, the invention relates to power cables comprising an insulation shield layer while in another aspect, the invention relates to insulation shield layers comprising a blend of ethylene copolymer and a styrenic polymer. In yet another embodiment, the invention relates to power cables comprising a polyolefin insulation layer adjacent to an insulation shield layer comprising a blend of ethylene copolymer and a styrenic polymer.

BACKGROUND OF THE INVENTION

Typical insulated electric power cables generally comprise one or more high potential conductors in a cable core that is surrounded by several layers of polymeric materials including a first semi-conductive shield layer (conductor or strand shield), an insulating layer (typically a non-conducting layer), a second semi-conductive shield layer (insulation shield), a metallic wire or tape shield used as the ground phase, and a protective jacket (which may or may not be semi-conductive). Additional layers within this construction, such as moisture impervious layer, are often included.

In general, semi-conducting shield layers can be classified into two distinct types. The first type is a shied layer that is securely bonded to the insulation layer so that stripping the shield layer is only possible by using a cutting tool that removes the shield layer with some of the insulation layer. The second type is a shield layer that is "strippable" from the insulation layer, i.e., the shield layer has a defined, limited adhesion to the insulation layer so that the former can be peeled away from the latter without removing latter. Stripability has conventionally been controlled through the use of highly polar polymer blends comprising ethylene vinyl acetate (EVA), nitrile rubber and chlorinated polyethylene (CPE).

Strippable shield formulations of EVA and nitrile rubbers are described in U.S. Pat. Nos. 4,286,023 and 4,246,142. One problem with the strippable shield formulations of EVA and nitrile rubber is that the formulations require relatively high vinyl acetate content to achieve the desired adhesion level, which results in the formulations being more rubbery then is desired for commercial, high speed extrusion of electric cable. Furthermore, nitrile rubber is expensive and has poor thermal stability, which negatively impacts properties after thermal aging.

Alternatively, adhesion-adjusting additives have been proposed for use with EVA, including, for example, waxy aliphatic hydrocarbons (U.S. Pat. No. 4,933,107); low-molecular weight polyethylene (U.S. Pat. No. 4,150,193); and silicone oils, rubbers and block copolymers that are liquid at room temperature (U.S. Pat. No. 4,493,787). However, these compositions have experienced only limited commercial success.

The need exists for a blend that will allow the insulation shield to be strippable while retaining sufficient adhesion so that the insulation shield layer does not strip away from the insulation layer during use. Furthermore, the blend should preferably exhibit crosslinkability and better thermal stability than EVA/polypropylene blends and EVA/nitrile-butadiene rubber (NBR) blends.

SUMMARY OF THE INVENTION

In one embodiment, the invention is a multilayer power cable in which one layer comprises a blend of ethylene copolymer and a styrenic polymer. In another embodiment, the invention is a power cable comprising an insulation layer and an adjacent, strippable shield layer in which the insulation layer comprises a polyolefin and the shield layer comprises a blend of ethylene copolymer and a styrenic polymer.

DESCRIPTION OF THE PREFERRED EMBODIMENTS

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of ethylene copolymer and styrenic polymer in the insulation shield layer.

"Cable," "power cable," and like terms means at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. No. 5,246,783, 6,496,629 and 6,714,707.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below.

"Interpolymer", "copolymer" and like terms means a polymer prepared by the polymerization of at least two different types of monomers. These generic terms include copolymers, usually employed to refer to polymers prepared from two different types of monomers, and polymers prepared from more than two different types of monomers, e.g., terpolymers, tetrapolymers, etc.

"Polyolefin", "PO" and like terms mean a polymer derived from simple olefins. Many polyolefins are thermoplastic and for purposes of this invention, can include a rubber phase. Representative polyolefins include polyethylene, polypropylene, polybutene, polyisoprene and their various interpolymers.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

Insulation Shield Layer:

The insulation shield layer comprises a blend of at least two components. The first component is at least one of an ethylene copolymer, preferably one of EVA copolymer, ethylene $C_{1-6}$ alkyl acrylate or methacrylate copolymer, or ethylene/$C_{1-6}$ alkyl acrylate/$C_{1-6}$ alkyl methacrylate terpolymers.

The ethylene copolymers useful in the insulation shield layer include ethylene/α-olefin interpolymers having a α-olefin content of between about 15, preferably at least about 20 and even more preferably at least about 25, weight percent (wt %) based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}C$ nuclear magnetic resonance (NMR) spectroscopy using the procedure described in Randall (*Rev. Macromal. Chem. Phys.*, C29 (2 & 3)).

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic, structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The ethylene copolymers used in the insulation shield layer of the cables of this invention can be used alone or in combination with one or more other ethylene copolymers, e.g., a blend of two or more ethylene copolymers that differ from one another by monomer composition and content, catalytic method of preparation, etc. If the ethylene copolymer is a blend of two or more ethylene copolymers, then the blend can be prepared by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of ethylene copolymers include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), and homogeneously branched, substantially linear ethylene/α-olefin polymers (e.g., AFFINITY® and ENGAGE® polyethylene available from The Dow Chemical Company). The more preferred ethylene copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

One preferred group of ethylene copolymers are the EVA copolymers, including but not limited to, EVA copolymers with a vinyl acetate, i.e., units derived from vinyl acetate, weight percentage range of 25 to 95 percent (%). Preferred EVA copolymers have a vinyl acetate content of at least 35, preferably at least 45 and even more preferably at least 55, weight percent (wt %). Typically, the EVA copolymer will have a vinyl acetate content that does not exceed 90, preferably does not exceed 80 and even more preferably does not exceed 70, wt %. The EVA copolymer used in the first component has a weight average molecular weight (Mw) of less than 200,000, preferably less than 150,000 and more preferably less than 100,000. Weight average molecular weight (Mw) is well known in the polymer art, and it can be determined by, for example, gel permeation chromatography as described in WO 2004/031250 A1.

One example of commercially available ethylene vinyl acetate is ELVAX® from E.I. duPont de Nemours and Company.

Another preferred group of ethylene copolymers are the ethylene alkyl acrylate copolymers and the ethylene alkyl methacrylate copolymers. The alkyl group can be any alkyl group selected from the $C_1$ to $C_6$ hydrocarbons, preferably the $C_1$ to $C_4$ hydrocarbons and even more preferable methyl. These copolymers will have an alkyl acrylate or alkyl methacrylate content of at least 35, preferably at least 45, and even more preferably at least 55, wt %. Typically, the copolymers will have an alkyl acrylate or alkyl methacrylate content that does not exceed 90, preferably does not exceed 80 and even more preferably does not exceed 70, wt %. These copolymers typically have an Mw of less than 200,000, preferably less than 150,000 and more preferably less than 100,000.

The ternary copolymers of ethylene with alkyl acrylates and alkyl methacrylates can be any suitable ternary copolymer. The alkyl group can be any alkyl group independently selected from the $C_1$ to $C_6$ hydrocarbons, preferably the $C_1$ to $C_4$ hydrocarbons and even more preferable methyl. Usually a ternary copolymer will be predominantly either an alkyl acrylate with a small portion of an alkyl methacrylate or an alkyl methacrylate with a small portion of an alkyl acrylate. The proportions of alkyl acrylate and alkyl methacrylate to ethylene will be about the same as the proportions described for ethylene alkyl acrylate copolymers or for ethylene alkyl methacrylate copolymers as well as the molecular weight ranges described for ethylene alkyl acrylate and ethylene alkyl methacrylate. The ternary copolymers of ethylene with alkyl acrylates and alkyl methacrylates used in the first component has a Mw of not more than 200,000, preferably not more than 150,000 and more preferably not more than 100,000.

The second component of the insulation shield layer is a styrenic polymer. Suitable styrenic polymers include but are not limited to homopolymer polystyrene, poly(methylstyrene), poly(ethylstyrene) poly(isopropylstyrene), poly(tert-butylstyrene), poly(divinyl benzene), poly(chlorostyrene), poly(bromostyrene), poly(fluorostyrene), poly(methoxystyrene), poly(ethoxystyrene) and copolymers thereof. A blend of more than one styrenic polymer may be used.

The styrenic polymer may be syndiotactic and atactic polystyrenes and high impact polystyrene resins, which are commercially available from various suppliers, including QUESTRA, STYRON, and STYRON-A-TECH, available from The Dow Chemical Company. Other commercially available styrenic polymers include XU70262.08, which is a general purpose polystyrene of 11 grams per 10 minutes (g/10 min) melt flow rate (MFR) and is also available from The Dow Chemical Company.

The styrenic polymer may be a triblock copolymer including but not limited to styrene-butadiene-styrene triblock copolymers (SBS), hydrogenated styrene-butadiene-styrene triblock copolymers (SEBS), hydrogenated styrene-butadiene diblock copolymers (SEB), styrene-isoprene-styrene triblock copolymers (SIS), hydrogenated styrene-isoprene-styrene triblock copolymers (SEPS), and hydrogenated styrene-isoprene diblock copolymers (SEP), styrene-acrylonitrile copolymers (SAN), and elastomer-modified SAN. The styrenic polymer may be a hydrogenated styrene-butadiene-styrene triblock copolymer, available from Shell Chemical under the trade name KRATON G-1652.

The styrenic polymer may be a styrene derivative including but not limited to alkylstyrenes such as p-methylstyrene, m-methylstyrene, o-methylstyrene, 2,4-dimethylstyrene, 2,5-dimethylstyrene, 3,4-dimethylstyrene, 3,5-dimethylstyrene, p-ethylstyrene, m-ethylstyrene, p-tert-butylstyrene, etc.; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; alkoxystyrenes such as p-methoxystyrene, m-methoxystyrene, o-methoxystyrene, p-ethoxystyrene, m-ethoxystyrene, o-ethoxystyrene, etc.; carboxyester styrenes such as p-carboxymethylstyrene, m-carboxymethylstyrene, o-carboxymethylstyrene, etc.; an alkylether styrenes such as p-vinylbenzylpropyl ether, etc. or a mixture of two or more kinds of these.

Polymerization (or copolymerization) of the styrene monomer may be bulk polymerization and may be carried out in the presence of a solvent, e.g. an aliphatic hydrocarbon such as pentane, hexane, heptane, etc.; an alicyclic hydrocarbon such as cyclohexane, etc.; and an aromatic hydrocarbon such as benzene, toluene, xylene, etc. The polymerization temperature may be any suitable temperature including but not limited to 20 to 80 C. Further, in order to control the molecular weight of the resulting styrene polymer, it may be effective to carry out the polymerization reaction in the presence of hydrogen.

The styrenic polymers comprise from 0.1 to 20, preferably from 0.5 to 15, more preferably from 1 to 10 and even more preferably from 2 to 7.5, wt % based on the weight of the blend, e.g., ethylene copolymer, styrenic polymer, carbon black, etc.

In addition to a blend of EVA and styrenic polymer, the insulation shield layer can also comprise carbon black. Typically, the carbon black has a surface area of 200 to 1000 square meters per gram ($m^2/g$, nitrogen surface area, ASTM D6556). Carbon Black Feedstock, which is available from The Dow Chemical Company, can be used to produce carbon black. Carbon blacks are commercially available and can be obtained from sources such as Columbian Chemical Company, Atlanta, Ga.

Insulation Layer:

The insulation layer comprises a polyolefin polymer. Polyolefin polymers used for the insulation layers of medium (3 to 60 kiloVolts (kV)) and high voltage (greater than 60 kV) power cables are typically made at high pressure in reactors that are typically tubular or autoclave in design, but these polymers can also be made in low-pressure reactors. The polyolefins used in the insulation layer can be produced using conventional polyolefin polymerization technology, e.g., Ziegler-Natta, metallocene or constrained geometry catalysis. Preferably, the polyolefin is made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. The catalyst is preferably mono-cyclopentadienyl, mono-indenyl or mono-fluorenyl CGC. The solution process is preferred. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212.

In general, polymerization can be accomplished at conditions well known in the art for Ziegler-Natta or Kaminsky-Sinn type polymerization reactions, that is, at temperatures from 0-250, preferably 30-200, degrees Centigrade (° C.), and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100.0(X) to 1:10, more preferably from 1:50,000 to 1:20, and most preferably from 1:10,000 to 1:30, in most polymerization reactions, the molar ratio of catalyst to polymerizable compounds employed is from $10^{-12}:1$ to $10^{-1}:1$, more preferably from $10^{-9}:1$ to $10^{-5}:1$.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

The polyolefin polymer can comprise at least one resin or its blends having melt index (MI, $I_2$) from 0.1 to about 50 grams per 10 minutes (g/10 min) and a density between 0.85 and 0.95 grams per cubic centimeter (g/cc). Typical polyolefins include high pressure low density polyethylene, high density polyethylene, linear low density polyethylene metallocene linear low density polyethylene, and CGC ethylene polymers. Density is measured by the procedure of ASTM D-792 and melt index is measured by ASTM D-1238 (190 C/2.16 kg).

In another embodiment, the polyolefin polymer includes but is not limited to copolymers of ethylene and unsaturated esters with an ester content of at least about 5 wt % based on the weight of the copolymer. The ester content is often as high as 80 wt %, and, at these levels, the primary monomer is the ester.

In still another embodiment, the range of ester content is 10 to about 40 wt %. The percent by weight is based on the total weight of the copolymer. Examples of the unsaturated esters are vinyl esters and acrylic and methacrylic acid esters. The ethylene/unsaturated ester copolymers usually are made by conventional high pressure processes. The copolymers can have a density in the range of about 0.900 to 0.990 g/cc. In yet another embodiment, the copolymers have a density in the range of 0.920 to 0.950 g/cc. The copolymers can also have a melt index in the range of about 1 to about 100 g/10 min. In still another embodiment, the copolymers can have a melt index in the range of about 5 to about 50 g/10 min.

The ester can have 4 to about 20 carbon atoms, preferably 4 to about 7 carbon atoms. Examples of vinyl esters are: vinyl acetate; vinyl butyrate; vinyl pivalate; vinyl neononanoate; vinyl neodecanoate; and vinyl 2-ethylhexanoate. Examples of acrylic and methacrylic acid esters are: methyl acrylate; ethyl acrylate; t-butyl acrylate; n-butyl acrylate; isopropyl acrylate; hexyl acrylate; decyl acrylate; lauryl acrylate; 2-ethylhexyl acrylate, lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; isooctyl methacrylate; and oleyl methacrylate. Methyl acrylate, ethyl acrylate, and n- or t-butyl acrylate are preferred. In the case of alkyl acrylates and methacrylates, the alkyl group can have 1 to about 8 carbon atoms, and preferably has 1 to 4 carbon atoms. The alkyl group can be substituted with an oxyalkyltrialkoxysilane.

Other examples of polyolefin polymers are: polypropylene; polypropylene copolymers; polybutene; polybutene copolymers; highly short chain branched α-olefin copolymers with ethylene co-monomer less than about 50 mole percent but greater than 0 mole percent; polyisoprene; polybutadiene; EPR (ethylene copolymerized with propylene); EPDM (ethylene copolymerized with propylene and a diene such as hexadiene, dicyclopentadiene, or ethylidene norbornene); copolymers of ethylene and an α-olefin having 3 to 20 carbon atoms such as ethylene/octene copolymers; terpolymers of ethylene, α-olefin, and a diene (preferably nonconjugated); terpolymers of ethylene, α-olefin, and an unsaturated ester; copolymers of ethylene and vinyl-tri-alkyloxy slime; terpolymers of ethylene, vinyl-tri-alkyloxy silane and an unsaturated ester; or copolymers of ethylene and one or more of acrylonitrile or maleic acid esters.

The polyolefin polymer of the insulation layer also includes ethylene ethyl acrylate, ethylene vinyl acetate, vinyl ether, ethylene vinyl ether, and methyl vinyl ether.

The polyolefin polymer of the insulation layer includes but is not limited to a polypropylene copolymer comprising at least about 50 mole percent units derived from propylene and the remainder from units from at least one α-olefin having up to about 20, preferably up to 12 and more preferably up to 8, carbon atoms, and a polyethylene copolymer comprising at least 50 mole percent units derived from ethylene and the remainder from units derived from at least one α-olefin having up to about 20, preferably up to 12 and more preferably up to 8, carbon atoms.

The polyolefin copolymers useful in the insulation layers also include the ethylene/α-olefin interpolymers previously described. Generally, the greater the α-olefin content of the interpolymer, the lower the density and the more amorphous the interpolymer, and this translates into desirable physical and chemical properties for the protective insulation layer.

The polyolefins used in the insulation layer of the cables of this invention can be used alone or in combination with one or more other polyolefins, e.g., a blend of two or more polyolefin polymers that differ from one another by monomer composition and content, catalytic method of preparation, etc. If the polyolefin is a blend of two or more polyolefins, then the polyolefin can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Exemplary polypropylenes useful in the practice of this invention include the VERSIFY® polymers available from The Dow Chemical Company, and the VISTAMAXX® polymers available from ExxonMobil Chemical Company. A complete discussion of various polypropylene polymers is contained in *Modern Plastics Encyclopedia/89*, mid October 1988 Issue, Volume 65, Number 11, pp. 6-92.

Both the insulation shield and insulation layers of the present invention also can comprise conventional additives including but not limited to antioxidants, curing agents, cross-linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. Additives can be used in amounts ranging from less than about 0.01 to more than about 10 wt % based on the weight of the composition.

Examples of antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl) diphenylamine, diphenyl-p-phenylenediamine, mixed di-aryl-p-phenylenediamines, and other hindered amine anti-degradants or stabilizers. Antioxidants can be used in amounts of about 0.1 to about 5 wt % based on the weight of the composition.

Examples of curing agents are as follows: dicumyl peroxide; bis(alpha-t-butyl peroxyisopropyl)benzene; isopropylcumyl t-butyl peroxide; t-butylcumylperoxide; di-t-butyl peroxide; 2,5-bis(t-butylperoxy)2,5-dimethylhexane; 2,5-bis(t-butylperoxy)-2,5-dimethylhexyne-3; 1,1-bis(t-butylperoxy) 3,3,5-trimethylcyclohexane; isopropylcumyl cumylperoxide; di(isopropylcumyl)peroxide; or mixtures thereof. Peroxide curing agents can be used in amounts of about 0.1 to 5 wt % based on the weight of the composition. Various other known curing co-agents, boosters, and retarders, can be used, such as triallyl isocyanurate; ethyoxylated bisphenol A dimethacrylate; alpha methyl styrene dimer; and other co-agents described in U.S. Pat. Nos. 5,346,961 and 4,018,852.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or n,n'-ethylenebisstearamide; polyethylene wax; oxidized polyethylene wax; polymers of ethylene oxide; copolymers of ethylene oxide and propylene oxide; vegetable waxes; petroleum waxes; non ionic surfactants; and polysiloxanes. Processing aids can be used in amounts of about 0.05 to about 5 wt % based on the weight of the composition.

Examples of fillers include but are not limited to clays, precipitated silica and silicates, fumed silica calcium carbonate, ground minerals, and carbon blacks with arithmetic mean particle sizes larger than 15 nanometers. Fillers can be used in amounts ranging from less than about 0.01 to more than about 50 wt % based on the weight of the composition.

The materials that comprise the insulation shield and insulation layers can be compounded or mixed by standard means known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfieiderer™ twin screw mixer, or a Buss™ kneading continuous extruder. The type of mixer utilized, and the operating conditions of the mixer, can affect the properties of a semiconducting material such as viscosity, volume resistivity, and extruded surface smoothness.

A cable containing an insulation shield layer comprising an ethylene copolymer, e.g., EVA, and a styrenic polymer can be prepared in various types of extruders, e.g., single or twin screw types. A description of a conventional extruder can be found in U.S. Pat. No. 4,857,600. An example of co-extrusion and an extruder therefore can be found in U.S. Pat. No. 5,575,965. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 1.5:1 to about 30:1. In wire coating where the polymeric insulation is crosslinked after extrusion, the cable often passes immediately into a heated vulcanization zone downstream of the extrusion die. The heated cure zone can be maintained at a temperature in the range of about 200 to about 350° C., preferably in the range of about 170 to about 250° C. The heated zone can be heated by pressurized steam, or inductively heated pressurized nitrogen gas.

The following examples further illustrate the invention. Unless otherwise noted, all parts and percentages are by weight.

Specific Embodiments

Example 1

Several different insulation shield layer compositions comprising a blend of EVA, a styrenic polymer, and carbon black are prepared and analyzed with the Plaque Adhesion Test (ASTM D-5289). This test measures the degree of adhesion between the insulation shield layer and the insulation layer. In addition, the degree of cross-linking in each composition is assessed by determining the change in torque, which is defined as the difference of maximum torque (Mh) and minimum torque (Ml), and measured using a MDR 2000 or Rubber Process Analyzer (RPA) 2000.

The first step in the Plaque Adhesion Test involves the preparation of a single layer of thermoplastic insulation and insulation shield compounds. A steam press is preheated to 12.0° C. for the insulation layer. For insulation compounds based on LLDPE, the steam press can be heated to 130° C. For this test method, the insulation compound contains Lupersol 130. With regard to the strippable shield compounds, the steam press is heated to 170° C. Next, pellets are pressed between two Mylar sheets under low pressure (1,000 pounds per square inch gauge (psig, 6.9 MegaPascal (MPa)) on single press or 2,500 psig (17.2 MPa) for double press) for 2 minutes and high pressure (2,500 psig (17.2 MPa) on single press or 25 ton (22,680 kilograms (kg)) for double press) for 3 minutes. The plaques are cooled to ambient temperature under high pressure for 10 minutes.

The second step in the Plaque Adhesion Test involves "sandwich-making" of thermoplastic single layers at ambient condition. A 30 milliliter (ml) plaque for the strippable insulation shield and a 125 ml plaque for the insulation layer are used. The smooth side of both the insulation shield layer and insulation layers are used for sandwich-making. A strip of Mylar, 1.5-inches (in., 3.81 centimeters (cm)), is used to separate the insulation shield layer from the insulation layer. This facilitates the start of stripping during the plaque adhesion measurement step. Next, the sandwich is placed in a 75 ml cavity mold between two Mylar sheets and covered with a flat plate. The steam press is preheated to 170° C., and the sandwich then is pressed at 170° C. at low pressure (1,000 psig (6.9 MPa) on single press or 2,500 psig (17.2 MPa) for double press) for 5 minutes. The steam pressure then is raised to a temperature of greater than (>) 190° C. and the sandwich cured at high pressure (2,500 psig (17.2 MPa) for single press or 10 ton (9,072 kg) for double press) for 25 minutes. The sandwich is allowed to cool to ambient temperature at high pressure for 15 minutes.

The final step in the Plaque Adhesion Test is to measure plaque adhesion on INSTRON equipment. First, the sandwich is cut into four strips of 1.5 in. (3.81 cm) wide; this size strip will allow proper mounting of sample on the INSTRON "wheel." Next, blades on the wheel are used to remove ⅛ in. (0.3175 cm) wide materials to allow clean stripping of half-inch wide (1.27 cm) insulation shield layer from the insulation layer. Finally, adhesion is measured using the automated test method on the INSTRON.

The composition of the insulation layer for each sample tested is the same and is described in Table 1. Each composition is tested three times, and the average of the three tests is reported in Table 1. DXM-445 (a high-pressure, low density polyethylene with a density of 0.92 g/cc and an MI of 2 g/10 min available from The Dow Chemical Company) and Luperox 130 peroxide available from Arkema are used. The degree of cross-linking for the insulation layer composition is measured by determining the change in torque, and this too is reported in Table 1.

TABLE 1

Composition and Cross-Linking Kinetics of Insulation Layer

| Component | Wt % |
|---|---|
| DXM-445-LDPE | 100 |
| Lupersol 130 peroxide | 0.79 |
| Mh (lb-in) @ 200° C. | 2.93 |
| Ml (lb-in) @ 200° C. | 0.16 |
| Delta Torque (lb-in) | 2.77 |

In total, seven different insulation shield layer compositions are tested: five comparative compositions comprising various percentages of EVA, carbon black, polypropylene and polystyrene (CE1 through CE5) and two compositions of this invention comprising EVA, carbon black and different styrenic polymers. The components of each insulation shield composition are provided in Table 2. For each insulation shield composition, the amount of cross-linking is determined by measuring the change in torque and the plaque adhesion test is performed to determine the strippable nature of the composition.

TABLE 2

Strippability of Insulation Shield Compounds

| Composition (wt %) | CE1 | CE2 | CE3 | CE4 | CE5 | EX. 1 | EX. 2 |
|---|---|---|---|---|---|---|---|
| Levapren 400 ethylene-vinyl acetate (EVA) | 64 | 43 | 43 | 43 | 59 | 59 | 59 |
| CSX-614 carbon black | 36 | 36 | 36 | 36 | 36 | 36 | 36 |
| NRD5-1476 homopolymer polypropylene | 0 | 21 | 0 | 0 | 5 | 0 | 0 |
| XU70262.08 polystyrene | 0 | 0 | 21 | 0 | 0 | 5 | 0 |
| Kristalex 3070 low molecular weight styrenic polymer | 0 | 0 | 0 | 21 | 0 | 0 | 5 |
| Lupersol 130 peroxide | 0.57 | 1.19 | 0.79 | 1.53 | 0.77 | 0.70 | 0.74 |
| Mh (lb-in) @ 200° C. | 7.90 | 7.61 | 8.20 | 7.00 | 7.27 | 7.13 | 7.11 |
| Ml (lb-in) @ 200° C. | 0.77 | 0.74 | 1.06 | 0.33 | 0.76 | 0.77 | 0.62 |
| Delta Torque (lb-in) | 7.13 | 6.87 | 7.14 | 6.67 | 6.51 | 6.36 | 6.49 |
| Plaque Adhesion (lb/0.5") to Insulation Layer of Table 1 | 10.4 | Brittle failure | Brittle failure | Tear | 10.1 | 10.0 | 9.2 |

Levapren ® 400 is an ethylene-vinyl acetate copolymer with 40 wt % vinyl acetate available from Lanxess Deutschland GmbH.
CSX614 is a carbon black available from Cabot Corporation.
NRD5-1476 is a polypropylene homopolymer available from The Dow Chemical Company.
XU70262.08 is general purpose polystyrene of 11 g/10 min MFR and is available from The Dow Chemical Company.
Kristalex ™ 3070 is a low molecular weight hydrocarbon resin comprised of units derived from alpha-methylstyrene or its derivatives, and it is available from Hercules, Inc.
Lupersol ™ 130 is 2,5-dimethyl-2,5-bis(t-butylperoxy)hexyne-3, and it is available from Atofina Chemicals, Inc.

Composition CE1 comprises EVA, carbon black and peroxide and results in a Plaque Adhesion Score of 10.4 with a change in torque of 7.13. Composition CE2 contains EVA, carbon black and polypropylene. However, CE2 is brittle, and results in being scored as a failure in the Plaque Adhesion Test. Likewise, CE3, which comprises EVA, carbon black and 21% polystyrene, is brittle and results in being scored as a failure in the Plaque Adhesion Test. CE4 comprises EVA, carbon black and 21% low molecular weight styrenic polymer, and results in a tear during the Plaque Adhesion test, CE5 comprises EVA, carbon black, and 5% polypropylene, and results in a score of 10.1 in the Plaque Adhesion Test.

Composition EX, 1 comprises EVA, carbon black, and 5% polystyrene, and results in a Plaque Adhesion Test score of 10.0. Composition EX. 2 comprises EVA, carbon black and 5% low molecular weight styrenic polymer, and has a Plaque Adhesion Test score of 9.2. The compositions of EX. 1 and EX. 2 yield similar strip forces to that of CE1, albeit at slightly higher levels of peroxide. However, the change in torque for CE1 is 7.13, while the change in torque for EX. 1 is 6.36 and 6.49 for EX. 9.

EX. 1 and EX. 2 have similar strip forces to CE5, which uses 5% polypropylene. However, EX. 1 and EX. 2 are expected to have better thermal stability than that of CE5 since polypropylene is known to degrade at elevated temperatures.

As demonstrated above, immiscible blends of EVA with styrenic polymers are found to exhibit the desired properties of cross-linkability and strippability. In addition, the blends of EVA with styrenic polymers have better thermal stability than EVA/polypropylene blends and EVA/NBR blends.

Although the invention has been described in considerable detail by the preceding specification, this detail is for the purpose of illustration and is not to be construed as a limitation upon the following appended claims. All publications cited above, specifically include all U.S. patents, allowed U.S. patent applications and U.S. Patent Application Publications, are here incorporated in their entirety by reference.

What is claimed is:

1. A power cable comprising an insulation shield layer in which the insulation shield layer in contact with an insulation layer, the insulation shield layer consisting of a blend of ethylene copolymer, carbon black and a styrenic polymer and the insulation layer consisting of a polyolefin polymer.

2. The power cable of claim 1 in which the ethylene copolymer comprises at least 45 wt % of the blend.

3. The power cable of claim 2 in which the ethylene copolymer is an EVA copolymer.

4. The power cable of claim 3 in which the styrenic polymer is at least one of polystyrene, poly(methylstyrene), poly (ethylstyrene) poly(isopropylstyrene), poly(tert-butylstyrene), poly(divinyl benzene), poly(chlorostyrene), poly (bromostyrene), poly(fluorostyrene), poly(methoxystyrene) and poly(ethoxystyrene).

5. The power cable of claim 4 in which the styrenic polymer comprises 0.1 to 20 wt % of the blend.

6. The power cable of claim 4 in which the styrenic polymer comprises 2.0 to 7.5 wt % of the blend.

7. The power cable of claim 3 in which the styrenic polymer is polystyrene.

8. The power cable of claim 3 in which the ethylene vinyl acetate comprises at least 45 wt % of the blend.

9. The power cable of claim 8 in which the styrenic polymer is at least one of polystyrene, poly(methylstyrene), poly (ethylstyrene) poly(isopropylstyrene), poly(tert-butylstyrene), poly(divinyl benzene), poly(chlorostyrene), poly (bromostyrene), poly(fluorostyrene), poly(methoxystyrene) and poly(ethoxystyrene).

10. The power cable of claim 1 in which the carbon black has a surface area of 200-1,000 m$^2$/g.

11. The power cable of claim 1 in which polyolefin polymer of the insulation layer is a polypropylene homopolymer or a polyethylene homopolymer.

12. The power cable of claim 1 in which the polyolefin polymer is a polypropylene copolymer comprising at least about 50 mole percent units derived from propylene and the remainder from units derived from at least one α-olefin comprising up to about 20 carbon atoms.

13. The power cable of claim 1 in which the polyolefin polymer is a polyethylene copolymer comprising at least about 50 mole percent units derived from ethylene and the remainder from units derived from at least one α-olefin having up to 20 carbon atoms.

14. The power cable of claim 13 in which the polyolefin polymer is linear low density polyethylene.

* * * * *